(12) United States Patent
Kaing et al.

(10) Patent No.: US 12,002,603 B2
(45) Date of Patent: Jun. 4, 2024

(54) DIELECTRIC, CIRCUMFERENTIALLY CONTINUOUS, MULTILAYERED TEXTILE SLEEVE AND METHOD OF CONSTRUCTION THEREOF

(71) Applicant: FEDERAL-MOGUL POWERTRAIN LLC, Southfield, MI (US)

(72) Inventors: Alice Kaing, Margny-les-Compiegne (FR); Amélie Simoens, Compiègne (FR); Mickael Horckmans, Etavigny (FR); Michael Pujos, Saint Etienne (FR); Mathieu Leone, Castelsarrasin (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 27 days.

(21) Appl. No.: 17/372,412

(22) Filed: Jul. 9, 2021

(65) Prior Publication Data
US 2023/0009469 A1 Jan. 12, 2023

(51) Int. Cl.
*H01B 7/18* (2006.01)
*D03D 1/00* (2006.01)
*B32B 1/08* (2006.01)
*B32B 25/10* (2006.01)
*B32B 25/20* (2006.01)

(52) U.S. Cl.
CPC ......... *H01B 7/1875* (2013.01); *D03D 1/0043* (2021.05); *H01B 7/1865* (2013.01); *B32B 1/08* (2013.01); *B32B 25/10* (2013.01); *B32B 25/20* (2013.01); *B32B 2250/03* (2013.01); *B32B 2262/0276* (2013.01); *B32B 2307/204* (2013.01); *B32B 2457/04* (2013.01)

(58) Field of Classification Search
CPC .. H01B 7/1875; H01B 7/1865; D03D 1/0043; H02G 3/0481; B32B 1/08; B32B 25/10; B32B 25/20; B32B 2250/03; B32B 2262/0276; B32B 2307/204; B32B 2457/04; B32B 27/283; B32B 2250/40; B32B 2307/732; B32B 2597/00; B32B 5/024; B32B 5/026; B32B 27/12
See application file for complete search history.

(56) References Cited

U.S. PATENT DOCUMENTS

2020/0179140 A1* 6/2020 Valois ................. D06M 15/643

* cited by examiner

*Primary Examiner* — James C Yager
(74) *Attorney, Agent, or Firm* — Robert L. Stearns; Dickinson Wright PLLC

(57) ABSTRACT

A multilayered textile sleeve for routing and protecting elongate members and method of construction thereof are provided. The multilayered textile sleeve includes a plurality of textile layers overlying one another to form a multilayered tubular wall extending lengthwise about a central axis between opposite open ends. The plurality of textile layers include a textile innermost layer and a textile outer layer. At least one silicone layer is sandwiched between the textile innermost layer and the textile outer layer.

15 Claims, 3 Drawing Sheets

22b, 122b, 122e
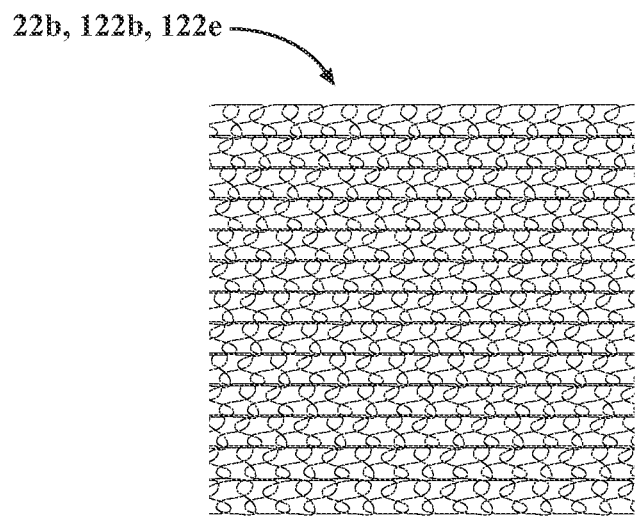
FIG. 4B
FIG. 5
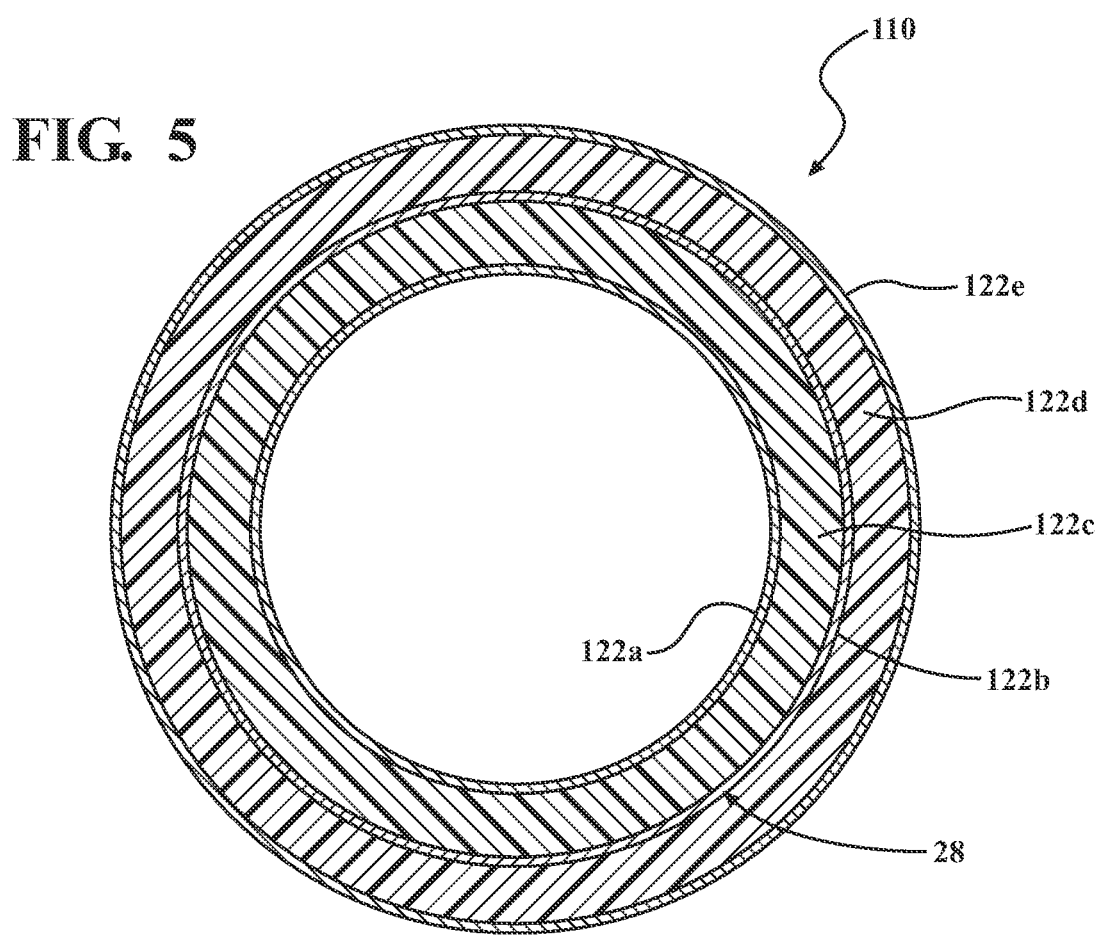

DIELECTRIC, CIRCUMFERENTIALLY CONTINUOUS, MULTILAYERED TEXTILE SLEEVE AND METHOD OF CONSTRUCTION THEREOF

BACKGROUND OF THE INVENTION

1. Technical Field

This invention relates generally to textile sleeves for protecting elongate members, and more particularly to dielectric, circumferentially continuous, multilayered textile sleeves.

2. Related Art

It is known to contain elongate members, such as wires, wire harnesses, cables and conduits of various types in circumferentially continuous, tubular walled sleeves to provide protection to the elongate members against impact and abrasion, fluid and thermal affects. In applications where high impact resistance is needed, sleeves having a wall including multiple overlying textile layers are known. Each of the textile layers of the multilayered wall are typically formed in direct engagement with one another, such that the impact resistance is provided solely by the material of the yarns used to form the individual textile layers. Although the aforementioned multilayered sleeves are generally suitable to provide enhanced impact resistance compared to single layer textile sleeves, further impact resistance is desired without having to greatly increase the thickness of the sleeve wall. Further yet, other forms of protection, such as dielectric protection resistance and/or cut-through resistance is desired.

SUMMARY OF THE INVENTION

One aspect of the disclosure provides a multilayered textile sleeve for routing and protecting elongate members. The sleeve includes a plurality of textile layers overlying one another to form a multilayered wall extending lengthwise about a central axis between opposite ends. The multilayered wall has a textile innermost layer and a textile outer layer, with a silicone layer sandwiched between the textile innermost layer and the textile outer layer. The silicone layer provides enhanced impact resistance, enhanced protection against contamination, and dielectric resistance to the multilayered textile sleeve.

In accordance with another aspect of the invention, the silicone layer is bonded directly to the textile innermost layer.

In accordance with another aspect of the invention, the textile outer layer can be formed as an outermost layer in engagement with the silicone layer.

In accordance with another aspect of the invention, the textile outermost layer can be provided in non-bonded relation with the abutting silicone layer, and thus, the textile outermost layer can be free to move relative to the silicone layer to enhance flexibility of the multilayered wall.

In accordance with another aspect of the invention, the textile innermost layer can be formed as one of a woven, braided or knit, circumferentially continuous wall.

In accordance with another aspect of the invention, the textile outer layer can be formed as one of an over-braided or over-knit, circumferentially continuous wall.

In accordance with another aspect of the invention, the thickness of the first silicone layer can be formed being between about 0.05 mm to 3 mm.

In accordance with another aspect of the invention, the thickness of the first silicone layer can be formed being between about 0.1 mm and 0.3 mm.

In accordance with another aspect of the invention, the textile innermost layer can be exposed to a central cavity extending between the opposite ends and the textile outermost layer can be exposed to an outer environment, with the silicone layer being a single silicone layer sandwiched in engagement with the textile innermost layer and the textile outermost layer.

In accordance with another aspect of the invention, the silicone layer has a dielectric breakdown voltage between about 5 to 40 kV.

In accordance with another aspect of the invention, a multilayered textile sleeve for routing and protecting elongate members consists of a tubular textile innermost layer; a tubular textile outermost layer, and a silicone layer sandwiched between the textile innermost layer and the textile outermost layer.

In accordance with another aspect of the invention, a method of constructing a multilayered sleeve is provided. The method includes weaving, braiding or knitting an innermost, circumferentially continuous, tubular wall; bonding a silicone layer to an outer surface of the innermost, circumferentially continuous, tubular wall; and disposing a knitted or braided wall about the silicone layer.

In accordance with another aspect of the invention, the method can further include performing the disposing step by over-knitting the knitted wall or over-braiding the braided wall about the silicone layer.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 4B is a view similar to FIG. 4A illustrating the outer textile layer being knitted in accordance with another embodiment of the disclosure; and FIG. 5 is a view similar to FIG. 2 of a multilayered textile sleeve constructed in accordance with another aspect of the disclosure.

DETAILED DESCRIPTION OF PREFERRED EMBODIMENTS

Figure 1:
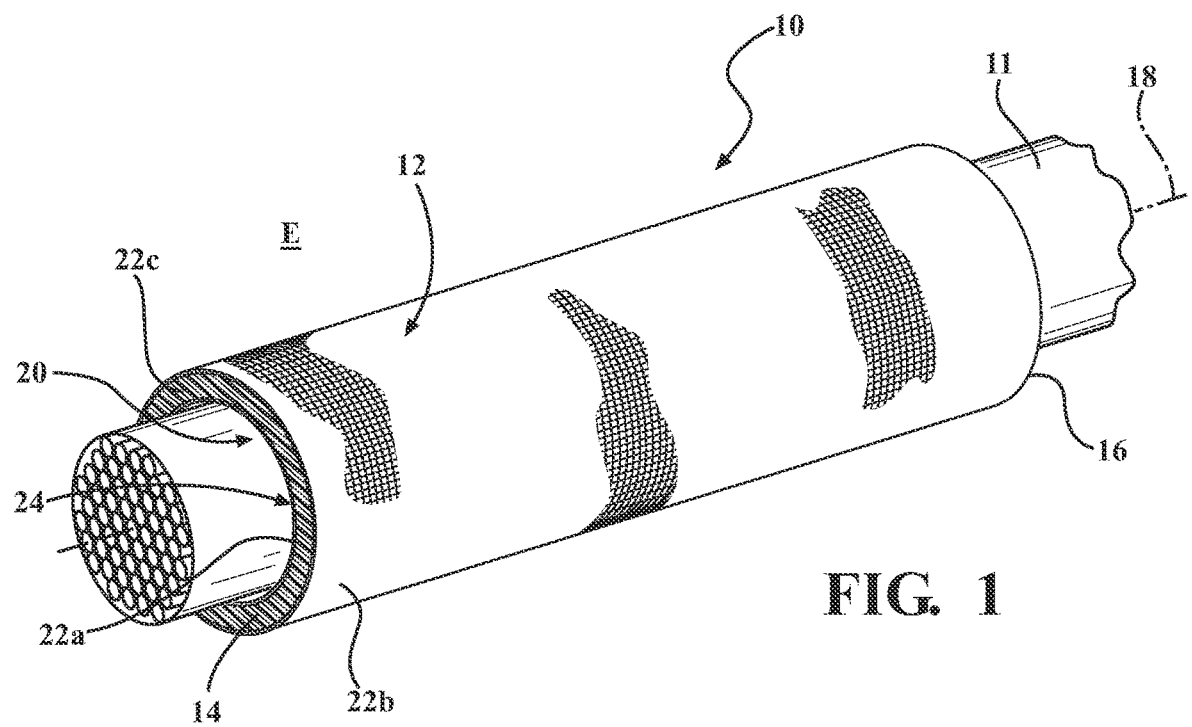
FIG. 1 is a schematic perspective view of a multilayered textile sleeve constructed in accordance with one aspect of the disclosure shown disposed about an elongate member to be protected.
Figure 2:
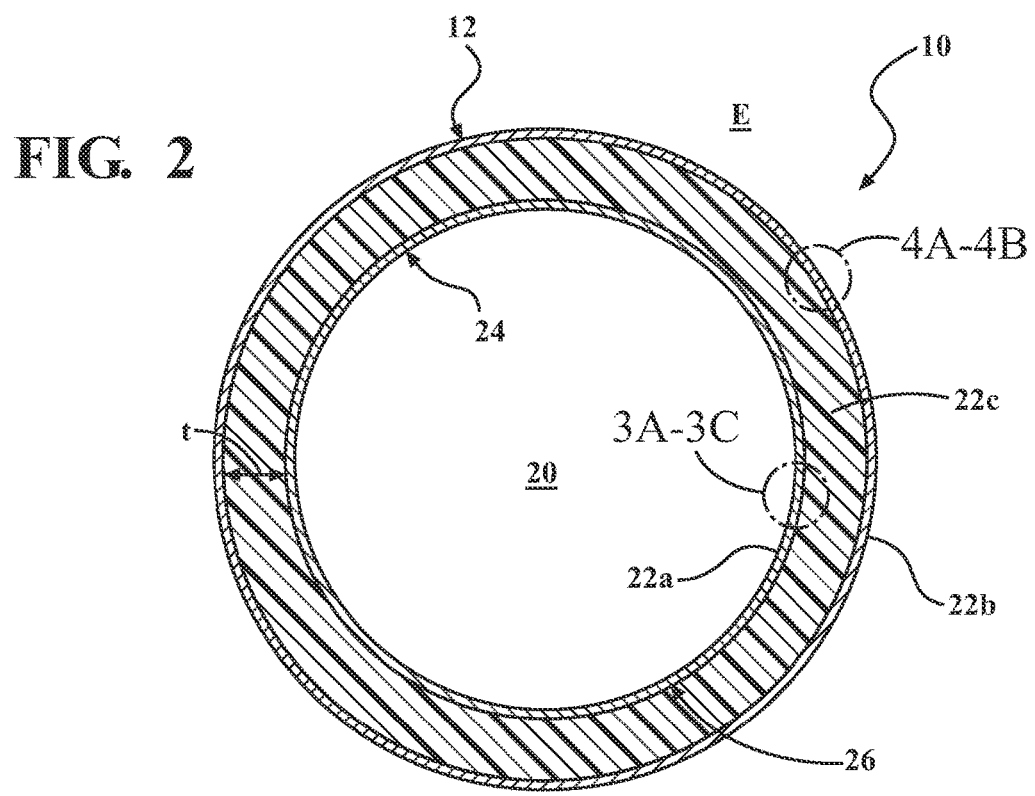
FIG. 2 is an enlarged schematic cross-sectional view taken generally along the line 2-2 of FIG. 1 with the elongate member removed.

Referring in more detail to the drawings, FIG. 1 illustrates a multilayered textile sleeve, referred to hereafter as sleeve 10, constructed in accordance with one aspect of the invention having a multilayered wall 12 disposed about an elongate member 11 to be protected, such as a wire harness, cable, conduit, or the like. The multilayered wall 12 extends lengthwise between open opposite ends 14, 16 and about a central axis 18 to bound a central cavity 20, through which the elongate member 11 extends and in which the elongate member 11 is protected against at least: electrical interference from electrical waves in an external environment E and from emitting electrical waves to the external environment E, impact forces, such as may be experienced in a vehicle crash, abrasion, and ingress of contamination, by way of example and without limitation. The multilayered wall 12 has a plurality of layers, including a textile innermost wall, also referred to as textile innermost layer or innermost layer 22a, a textile outer wall, also referred to as textile outer layer or outer layer 22b, and an intermediate layer that is provided as at least one silicone layer 22c, wherein the silicone layer 22c is sandwiched between the innermost and outer layers 22a, 22b.

Figure 3A:
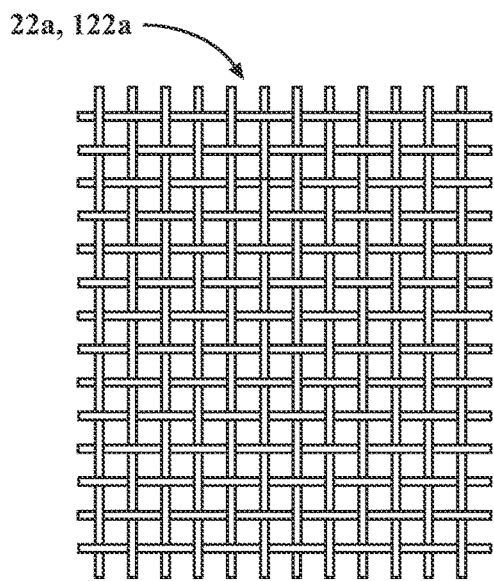
FIG. 3A is a schematic plan view of a portion of an innermost textile layer of the sleeve illustrating the innermost textile layer being woven in accordance with one embodiment of the disclosure.
Figure 3B:
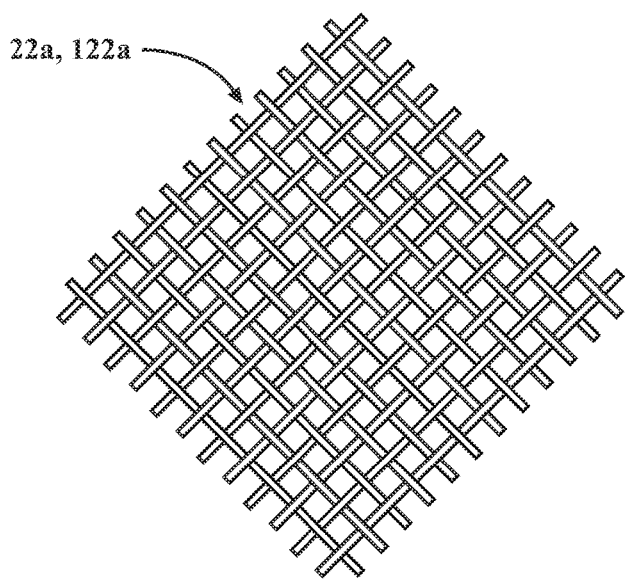
FIG. 3B is a view similar to FIG. 3A illustrating the innermost textile layer being braided in accordance with another embodiment of the disclosure.
Figure 3C:
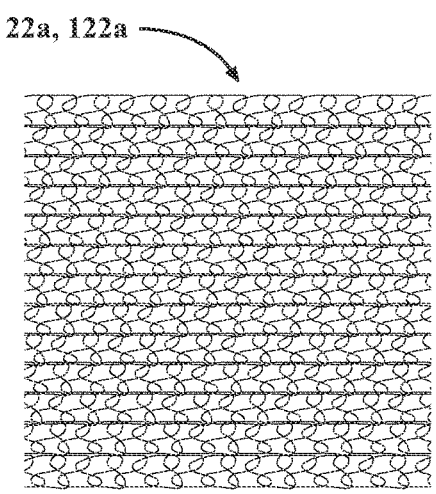
FIG. 3C is a view similar to FIG. 3A illustrating the innermost textile layer being knitted in accordance with yet another embodiment of the disclosure.

The innermost layer 22a is openly exposed to the central cavity 20 extending between said opposite ends. As such, the elongate member 11 contacts an inner surface 24 of the innermost layer 22a. The innermost layer 22a is formed as a circumferentially continuous wall, and is constructed via a weaving, braiding, or knitting process. Accordingly, the innermost layer 22a is one of a woven (FIG. 3A), braided (FIG. 3B) or knit (FIG. 3C) tubular, seamless wall 22a. The innermost layer 22a can be constructed using any desired yarn, whether monofilament and/or multifilament yarn, and in one exemplary embodiment, is constructed with high tenacity polyester yarn, which provides enhanced protection against abrasion and resistance to being cut-through. Accordingly, the innermost layer 22a possesses excellent protection against damage to the elongate member 11.

The at least one silicone layer includes a first silicone layer 22c bonded directly to an outer surface 26 of the innermost layer 22a. The silicone layer 22c can be applied to the outer surface 26 using any desired process that allows the preferred thickness (t) of the silicone layer 22c to be attained. In the exemplary embodiment, the thickness t is between about 0.05 and 3 mm, and more preferably between about 0.1 and 0.3 mm. When the silicone layer 22c is provided within the aforementioned range of thickness t, optimal dielectric strength is provided, which provides a dielectric breakdown voltage between about 5 to 40 kV. Accordingly, the elongate member 11 is protected against unwanted electrical interference, including electromagnetic interference (EMI), radiofrequency interference (RFI), and electrostatic discharge (ESD). In addition to the various electrical protections, greatly enhanced protection to the elongate member 11 against impact forces is provided by the silicone layer 22c. Further yet, enhanced protection against the ingress of contamination, such as fluid and debris, given the silicone layer is hydrophobic and impervious to fluid and debris.

Figure 4A:
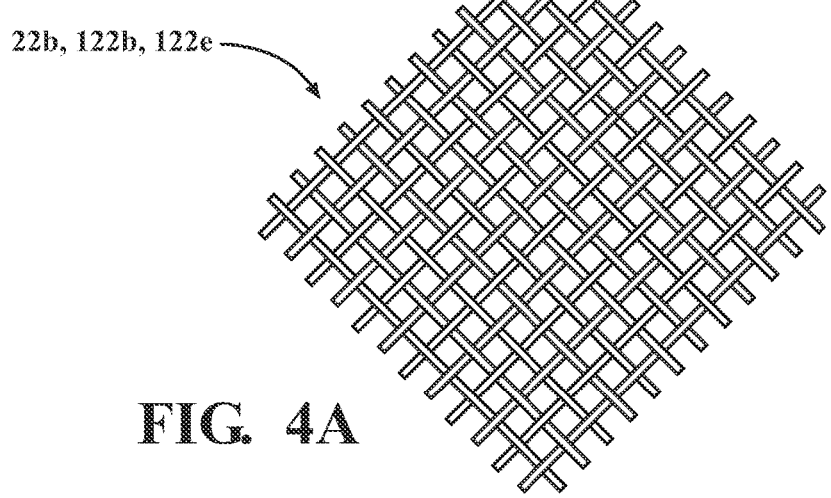
FIG. 4A is a view similar to FIG. 3A illustrating an outer textile layer of the sleeve being braided in accordance with one embodiment of the disclosure.

The outer layer 22b can be formed as a textile outermost layer 22b, and further, the textile outermost layer 22b can be formed or disposed in engagement with the silicone layer 22b. The outermost layer 26b can remain unbonded with the silicone layer 22c, and thus, the outermost layer 26b can be free to move relative to the silicone layer 22c. Wherein the outermost layer 22b engages the silicone layer 22c, the outermost layer 22b and the innermost layer 22a are spaced from one another by the thickness (t) of the silicone layer 22c. The textile outermost layer 22b is formed as a circumferentially continuous wall, and is constructed as a braided wall (FIG. 4A) via a braiding process or as a knit wall (FIG. 4B) via a knitting process. Accordingly, the outermost layer 22b is one of a braided or knit tubular, seamless wall 22b, which can be over-braided or over-knit onto the silicone layer 22c. The outermost layer 22b can be constructed using any desired yarn, whether monofilament and/or multifilament yarn, and in one exemplary embodiment, is constructed with high tenacity polyester yarn, which provides enhanced protection against abrasion and being cut-through, as discussed above for the innermost layer 22a.

FIG. 5 illustrates a multilayered textile sleeve, referred to hereafter as sleeve 110, constructed in accordance with another aspect of the invention, wherein the same reference numerals as used above, offset by a factor of 100, are used to identify like features.

The sleeve 110 has a multilayered wall 112 including an innermost layer 122a and an outer layer 122b with a first silicone layer 122c sandwiched therebetween, as discussed above. However, the outer layer 122b is not an outermost layer, but rather, a second silicone layer 122d is provided on an outer surface 28 of the outer layer 122b, with an outermost layer 122e being disposed about the second silicone layer 122d in engagement therewith. The innermost layer 122a can be constructed as discussed above for the innermost layer 22a, with the construction thereof being as discussed and shown in FIGS. 3A-3C. The outer layer 122b and the outmost layer 122e can be constructed as discussed above for the outermost layer 22b, with the construction thereof being as discussed and shown in FIGS. 4A-4B. The silicone layers 122c and 122d can be provided as discussed above for the silicone layer 22c, including the relative thicknesses thereof.

In accordance with another aspect, a method of constructing a multilayered sleeve 10, 110 is provided. The method includes weaving, braiding or knitting an innermost, circumferentially continuous, tubular wall 22a, 122a; bonding a first silicone layer 22c, 122c to an outer surface 26 of the innermost, circumferentially continuous, tubular wall 22a, 122a; and disposing a knitted or braided wall 22b, 122b, 122e about the first silicone layer 22c, 122c.

The method can further include performing the disposing step by over-knitting the knitted wall 22b, 122b, 122e or over-braiding the braided wall 22b, 122b, 122e about the first silicone layer 22c, 122c.

The method can further include over-knitting the knitted wall 22b, 122b or over-braiding the braided wall 22b, 122b into engagement with an outer surface of the first silicone layer 22c, 122c.

The method can further include disposing a first knitted or first braided wall 122b in engagement with an outer surface of the first silicone layer 122c; bonding a second silicone layer 122d to an outer surface 28 of the first knitted or first braided wall 122b, and disposing a second knitted or second braided wall 122e in engagement with an outer surface of the second silicone layer 122d.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A multilayered textile sleeve for routing and protecting elongate members, comprising:
   a plurality of textile layers overlying one another to form a multilayered tubular wall extending lengthwise about a central axis between opposite open ends, said plurality of textile layers including a textile innermost layer and at least one textile outer layer; and
   at least one silicone layer sandwiched between said textile innermost layer and said at least one textile outer layer, wherein said at least one textile outer layer includes a textile outermost layer, said textile outermost layer is in engagement with a first silicone layer of said at least one silicone layer, and wherein said textile outermost layer is not bonded to said first silicone layer and is free to move relative to said first silicone layer.

2. The multilayered textile sleeve of claim 1, wherein said first silicone layer is bonded directly to said textile innermost layer.

3. The multilayered textile sleeve of claim 1, wherein said textile outermost layer is spaced from said textile innermost layer by a thickness of said first silicone layer.

4. The multilayered textile sleeve of claim 3, wherein said thickness of said first silicone layer is between about 0.05 mm and 3 mm.

5. The multilayered textile sleeve of claim 4, wherein said thickness of said first silicone layer is between about 0.1 mm and 0.3 mm.

6. The multilayered textile sleeve of claim 4, wherein said textile innermost layer is exposed to a central cavity extending between said opposite ends and said textile outermost layer is exposed to an outer environment.

7. The multilayered textile sleeve of claim 4, wherein said first silicone layer has a dielectric breakdown voltage between about 5 to 40 kV.

8. The multilayered textile sleeve of claim 1, wherein said textile innermost layer is one of a circumferentially continuous woven, braided or knit tubular wall.

9. The multilayered textile sleeve of claim 8, wherein said textile outermost layer is one of a circumferentially continuous braided or knit tubular wall.

10. The multilayered textile sleeve of claim 1, wherein said at least one textile outer layer includes an intermediate textile outer layer spaced from said textile innermost layer by a second silicone layer of said at least one silicone layer.

11. A multilayered textile sleeve for routing and protecting elongate members, consisting of:
    a tubular textile innermost layer;
    a tubular textile outermost layer; and
    a silicone layer sandwiched between said textile innermost layer and said textile outermost layer, wherein said tubular textile outermost layer is not bonded to said silicone layer and is free to move relative to said silicone layer.

12. The multilayered textile sleeve of claim 11, wherein said tubular textile innermost layer and said tubular textile outermost layer are in engagement with said silicone layer.

13. The multilayered textile sleeve of claim 12, wherein said silicone layer is bonded to said tubular textile innermost layer.

14. The multilayered textile sleeve of claim 13, wherein said tubular textile outermost layer is spaced from said tubular textile innermost layer by a thickness of said silicone layer.

15. The multilayered textile sleeve of claim 14, wherein said thickness of said silicone layer is between about 0.05 mm and 3 mm.

* * * * *